United States Patent [19]

Hessmert et al.

[11] Patent Number: 5,333,108
[45] Date of Patent: Jul. 26, 1994

[54] DRIVE SLIP CONTROL SYSTEM

[75] Inventors: Ulrich Hessmert, Schwieberdingen; Manfred Meissner, Unterriexingen; Martin Meurer, Cochem; Reiner Folke, Ditzingen, all of Fed. Rep. of Germany

[73] Assignee: Robert Bosch GmbH, Stuttgart, Fed. Rep. of Germany

[21] Appl. No.: 635,137

[22] PCT Filed: May 9, 1989

[86] PCT No.: PCT/EP89/00506
§ 371 Date: Oct. 10, 1991
§ 102(e) Date: Oct. 10, 1991

[87] PCT Pub. No.: WO90/00120
PCT Pub. Date: Jan. 11, 1990

[30] Foreign Application Priority Data

Jun. 28, 1988 [DE] Fed. Rep. of Germany ....... 3821769

[51] Int. Cl.$^5$ .......................... G06F 15/48; B60T 8/58
[52] U.S. Cl. .......................... 364/426.03; 364/426.02; 303/100
[58] Field of Search ............ 364/426.02, 426.03; 180/197; 303/100, 92, 110, 103

[56] References Cited

U.S. PATENT DOCUMENTS

| | | | |
|---|---|---|---|
| 3,802,529 | 4/1974 | Burckhardt et al. | 303/21 EB |
| 4,682,667 | 7/1987 | Hosaka | 180/197 |
| 4,722,411 | 2/1988 | Ohashi et al. | 180/197 |
| 4,760,893 | 8/1988 | Sigl et al. | 180/197 |
| 4,778,025 | 10/1988 | Sakaguchi et al. | 180/197 |
| 4,804,058 | 2/1989 | Leiber et al. | 180/197 |
| 4,866,623 | 9/1989 | Ise et al. | 364/426.03 |
| 4,866,625 | 9/1989 | Kawamoto et al. | 364/426.02 |
| 4,924,396 | 5/1990 | Fujioka et al. | 364/426.03 |
| 4,932,726 | 6/1990 | Iwata et al. | 303/100 |
| 4,933,857 | 6/1990 | Hashiguchi et al. | 364/426.02 |
| 4,947,954 | 8/1990 | Fujita et al. | 180/197 |
| 4,949,265 | 8/1990 | Eguchi et al. | 364/424.05 |
| 4,965,729 | 10/1990 | Häfner | 364/426.03 |
| 5,233,529 | 8/1993 | Braschel et al. | 364/426.02 |

Primary Examiner—Thomas G. Black
Assistant Examiner—Tan Q. Nguyen
Attorney, Agent, or Firm—Felfe & Lynch

[57] ABSTRACT

The actual quotient of the engine speed and sensed speed of the driven wheels is compared to a reference quotient calculated from the engine speed and the instantaneous gear ratio. When wheel vibrations affect the sensed wheel speed signals to an unacceptable degree, the actual quotient will deviate from the reference quotient by more than a prescribed amount. A reference wheel speed calculated from the reference quotient and the engine speed will then be used to determine slippage values, which in turn are used to generate control signals from braking and limiting engine torque. The reference wheel speed may either be used to replace the sensed wheel speeds or to limit the increase in the sensed wheel speeds.

2 Claims, 1 Drawing Sheet

DRIVE SLIP CONTROL SYSTEM

BACKGROUND OF THE INVENTION

The invention relates to systems of the type where slippage of the driven wheels is controlled by monitoring the wheel speeds to determine slippage and generating control signals for braking the driven wheels and limiting engine torque when slippage is determined. They use the wheel acceleration of the driven. Drive slip control systems having the features of the preamble of claim 1 are known. They use the wheel acceleration of the driven wheels and/or the wheel slippage of the driven wheels obtained by means of the speed signals of the non-driven wheels to actuate control. In order to avoid control errors caused by interference suppressing the wheel speeds, e.g. wheel-induced vibrations, it is known to reduce these interferences by filtering.

U.S. Pat. No. 4,760,893 discloses deriving the reference value needed to determine slippage from the speeds of the non-driven wheels. The reference value is observed for physically impossible changes and disregarded when this occurs.

SUMMARY OF THE INVENTION

The inventive solution of the problem provides a control that is improved and more effective as compared to known solutions. The quotient of the engine speed and the average speed of the driven wheels determined from the sensed speeds thereof is compared to a reference quotient and a signal is generated when the deviation exceeds a prescribed amount. The signal prompts the use of a reference wheel speed determined from the engine speed and the instantaneous gear ratio to determine slippage. The reference wheel speed may be used to replace the sensed wheel speed or to limit the acceleration derived from the sensed wheel speeds. In the latter case the limited wheel accelerations are used to determine slippage, i.e., tendency of the wheels to spin. This invention ensures that the use of the recognition of such vibrations does not negatively affect the control. (The control does not enhance the wheel vibrations).

DETAILED DESCRIPTION OF THE PREFERRED EMBODIMENTS

Figure 1:
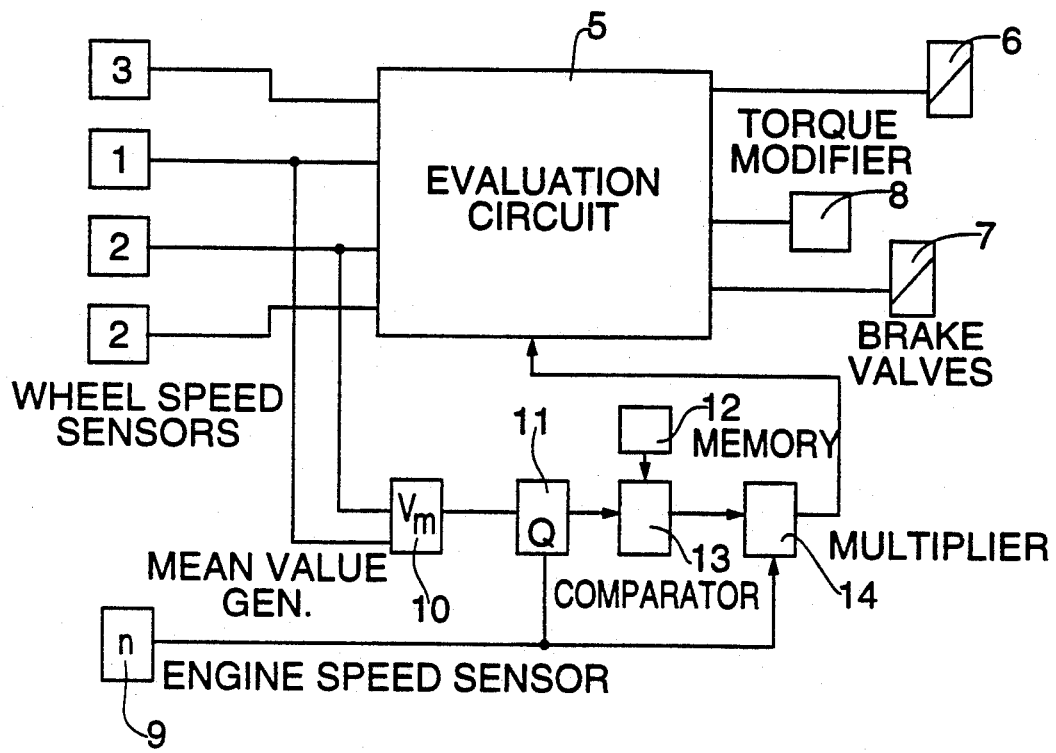
FIG. 1 is a diagram of the inventive system

In FIG. 1, the wheel speed sensors 1, 2 determine the speeds of the driven wheels of a vehicle, and the sensors 3, 4 determine the speeds of the non-driven wheels. An evaluation circuit 5 converts the sensor signals into control signals to avoid drive slippage, two valves 6, 7 varying the brake pressure of the driven wheels, and a modifier element 8 changing the engine torque.

In order to carry out the control in a known way, the evaluation circuit 5 can use the wheel slippage as well as wheel acceleration and deceleration.

If interference vibrations are superimposed on the sensor signals, these vibrations simulate acceleration and deceleration as well as wheel slippage which activate and change control.

Here the invention sets in. The engine speed sensed by an engine speed sensor 9 and the averaged speed $V_m$ of the driven wheels determined in a mean value generator 10 are used to determine an actual quotient Q in block 11. This quotient is proportional to $n/V_m$ (or $V_m/n$). In vehicles with a stick shift, when a gear is energized and without interference, this quotient is a gear-dependent constant, i.e. there are as many constant values as there are gears (desired quotient). These values are stored in a memory 12. In a comparator 13, the quotient determined in block 11 is compared to the closest value stored in memory 12. If there is a deviation greater than an allowed tolerance, an interference is indicated and comparator 13 supplies an output signal. Comparator 13 is adjusted such that this output signal corresponds to the reference quotient just selected. In a multiplier 14, a reference wheel speed signal is formed from the engine speed and the given reference quotient. This signal is supplied to the evaluation circuit 5 where it is used as an instantaneous wheel speed for slippage formation or acceleration/deceleration determination and for control by braking at least one of the driven wheels and/or decreasing the engine torque. These functions are carried out by the control valves 6, 7 and the torque modifier 8.

Figure 2:
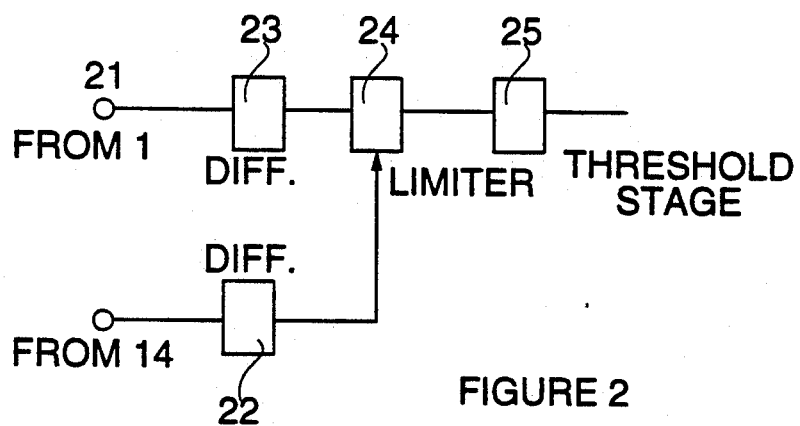
FIG. 2 is a detailed partial diagram of a possible evaluation circuit of FIG. 1.

In FIG. 2, at a terminal 20, the wheel speed signal that is artificially produced in multiplier 14 is made available and the slope of this signal is obtained in a differentiator 22. This signal is supplied to a limiter 24 to which the wheel speed of a wheel sensor 1 or 2, which was differentiated in differentiator 23 and supplied via terminal 21, is also supplied.

The effect of the limiter 24 is such that the wheel acceleration signal supplied by differentiator 23 is limited by the acceleration signal supplied by differentiator 22. This means, slopes of the wheel speed signal at terminal 21 that are greater than the those of the artificial wheel speed signal at terminal 20, prompted by interferences, will be suppressed.

The limited acceleration signal of limiter 24 is then supplied to a threshold stage 25 the output signal of which prompts the control. An arrangement corresponding to the one of 23 - 25 may be provided for the other driven wheel.

Alternatively, it is possible to associate a determined quotient with a deviation range and have the above effect take action when the deviation range is exceeded.

We claim:

1. Drive slip control system for a vehicle having an engine which transmits torque to the driven wheels through a transmission having a plurality of gear ratios, said system comprising
   - wheel speed sensors for determining speeds of the driven wheels and generating sensed wheel speed signals corresponding to the determined speeds,
   - means for determining an average wheel speed of the driven wheels from said sensed wheel speed signals,
   - means for determining engine speed,
   - means for generating an actual quotient from the average wheel speed and the engine speed,
   - means for determining and storing a plurality of constant values based on respective gear ratios,
   - means for comparing the actual quotient to the closest constant value and generating an output signal corresponding to said closest constant value when a prescribed deviation between said actual quotient and said closest constant value is exceeded, means for generating a reference wheel speed signal from said closest constant value and said engine speed, and evaluation circuit means which receives said sensed wheel speed signals, determines slippage of said driven wheels therefrom, and generates control signals for at least one of braking at least one of said driven wheels and decreasing the engine torque when slippage is determined, said slippage being determined from said reference wheel speed signal when said prescribed deviation is exceeded.

2. Drive slip control system for a vehicle having an engine which transmits torque to the driven wheels through a transmission having a plurality of gear ratios, said system comprising wheel speed sensors for determining speeds of the driven wheels and generating sensed wheel speed signals corresponding to the determined speeds, means for determining actual accelerations of the driven wheels from the sensed wheel speed signals and generating actual wheel acceleration signals, means for determining an average wheel speed of the driven wheels from said sensed wheel speed signals, means for determining engine speed, means for generating an actual quotient from the average wheel speed and the engine speed, means for determining and storing a plurality of constant values based on respective gear ratios, means for comparing the actual quotient to the closest constant value and generating an output signal corresponding to said closest constant value when a prescribed deviation between said actual quotient and said closest constant value is exceeded, means for generating a reference wheel speed signal from said output signal corresponding to said closest constant value and said engine speed, means for generating a reference wheel acceleration signal from said reference wheel speed signal, and evaluation circuit means which receives said actual wheel acceleration signals and said reference wheel acceleration signal, limits the actual wheel acceleration signals by the reference wheel acceleration signal, determines slippage of said driven wheels from the actual wheel acceleration signals, and generates control signals for at least one of braking at least one of said driven wheels and decreasing the engine torque when slippage is determined.

* * * * *